US012128537B2

(12) United States Patent
Jenkins et al.

(10) Patent No.: US 12,128,537 B2
(45) **Date of Patent: *Oct. 29, 2024**

(54) ROTARY TOOL

(71) Applicant: TECHTRONIC CORDLESS GP, Anderson, SC (US)

(72) Inventors: James W. Jenkins, Williamston, SC (US); Jesse J. Jerabek, Easley, SC (US); David Bayless, Seneca, SC (US); I. Daniel Smith, Greenville, SC (US); Brent N. Gregorich, Easley, SC (US); Ashley Poteet, Greenville, SC (US); Yun Biao Bai, Guangdong (CN); De Xiang Jin, Guangdong (CN); Yan Jun Zhang, Guangdong (CN)

(73) Assignee: Techtronic Cordless GP, Anderson, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/328,450

(22) Filed: Jun. 2, 2023

(65) Prior Publication Data

US 2023/0311291 A1 Oct. 5, 2023

Related U.S. Application Data

(63) Continuation of application No. 16/876,821, filed on May 18, 2020, now Pat. No. 11,691,259.

(51) Int. Cl.
*B25F 3/00* (2006.01)
*B25F 5/02* (2006.01)

(52) U.S. Cl.
CPC ................ *B25F 3/00* (2013.01); *B25F 5/029* (2013.01)

(58) Field of Classification Search
CPC ... B25C 7/06; B25F 3/00; B25F 5/029; B25H 1/12; B25H 3/006; B25H 3/021
See application file for complete search history.

(56) References Cited

U.S. PATENT DOCUMENTS

| | | | |
|---|---|---|---|
| 1,698,952 | A | 1/1929 | Hoover |
| 1,828,820 | A | 10/1931 | Schulse |
| 2,536,017 | A | 4/1947 | Bamberger |

(Continued)

FOREIGN PATENT DOCUMENTS

| | | | |
|---|---|---|---|
| CN | 201604059 | U | 10/2010 |
| CN | 205465533 | U | 8/2016 |

(Continued)

*Primary Examiner* — Thomas M Wittenschlaeger
*Assistant Examiner* — David G Shutty
(74) *Attorney, Agent, or Firm* — Michael Best & Friedrich LLP

(57) ABSTRACT

A rotary tool assembly includes a rotary tool having a body with a working end and a rear end, a motor disposed within the body, and a drive shaft rotatably driven by the motor. A base of the rotary tool assembly includes a battery receptacle configured to receive a battery pack and a stand for supporting the rotary tool when the rotary tool is not in use. The stand includes two arms defining a tool receptacle therebetween in which the rotary tool is supported. A power cord extends between the base and the rotary tool to transfer electric power from the base to the rotary tool to selectively power the motor. The battery pack is received in the battery receptacle for form a foot of the base.

21 Claims, 9 Drawing Sheets

(56) References Cited

U.S. PATENT DOCUMENTS 2,596,335 A 5/1952 Kessler
2,679,061 A 5/1954 Baker
2,904,804 A 9/1959 Odessey
2,907,147 A 10/1959 Hall et al.
3,274,737 A 9/1966 Rocher et al.
3,783,364 A * 1/1974 Gallanis ................. G04B 47/00 206/229
3,924,097 A * 12/1975 Knowles ................ B23K 3/027 219/229
4,049,009 A 9/1977 Marchand
4,137,589 A 2/1979 Sukhraj
4,179,632 A 12/1979 Harvell
4,213,276 A 7/1980 Jennings
4,215,601 A 8/1980 Mann
4,250,587 A 2/1981 Beck, Jr.
4,317,578 A 3/1982 Welch
4,348,603 A * 9/1982 Huber .................... H01H 9/063 200/522
4,850,111 A 7/1989 McCullough
4,917,239 A * 4/1990 Smith .................... B25H 3/006 206/349
4,922,613 A 5/1990 McCullough
4,956,589 A 9/1990 Cherlo
4,964,839 A 10/1990 Gloor
4,989,323 A 2/1991 Casper et al.
4,993,502 A 2/1991 McCullough
5,025,559 A 6/1991 McCullough
5,048,742 A * 9/1991 Fortune .................. B23K 3/033 219/242
5,245,735 A 9/1993 Tanashia
6,152,639 A * 11/2000 Hsu ........................... B25F 5/00 439/446
6,191,554 B1 * 2/2001 Nakane ................. H02J 7/0069 320/114
6,364,580 B1 * 4/2002 Dils ........................ B25F 5/029 408/16
6,666,758 B1 12/2003 Parrott
6,713,905 B2 3/2004 Hirschburger et al.
6,790,144 B2 9/2004 Talesky
6,814,157 B2 11/2004 Maras
6,821,048 B2 11/2004 Talesky
7,217,069 B2 * 5/2007 Dils ......................... G01V 3/15 324/67
7,489,111 B2 * 2/2009 Wise ....................... A45F 5/021 224/904
7,546,785 B2 * 6/2009 Roehm ................. H02J 7/0044 320/114
7,723,953 B2 * 5/2010 Roehm ................... B25B 21/00 81/436
7,936,148 B2 * 5/2011 Roehm ................... B25B 21/00 320/112
8,250,766 B2 8/2012 Levsen
8,272,813 B1 * 9/2012 Wise .................... B23D 59/001 408/16
8,343,643 B2 1/2013 Miller et al.
8,381,833 B2 * 2/2013 Bernardi ................. B25B 28/00 173/217
8,968,107 B2 3/2015 Rapp et al.
9,121,438 B2 9/2015 Mascari
9,265,263 B2 2/2016 Whited et al.
9,687,927 B2 * 6/2017 Stuckey ................. B23K 3/028
10,400,815 B2 9/2019 Whited et al.
10,493,579 B2 12/2019 Padget et al.
10,870,195 B2 * 12/2020 Sergyeyenko .......... B25F 5/029
2002/0050364 A1 * 5/2002 Suzuki ................ B25B 23/1405 173/1
2003/0196824 A1 * 10/2003 Gass ..................... B23B 45/008 173/131
2005/0153596 A1 * 7/2005 VanWambeke ........ H01R 31/06 439/500
2005/0161305 A1 7/2005 Jenni et al.
2005/0161357 A1 * 7/2005 Allan ........................ B25B 1/24 206/373
2005/0200087 A1 * 9/2005 Vasudeva .................. B25F 3/00 279/143
2007/0065246 A1 * 3/2007 Baber ..................... B25F 5/029 409/182
2007/0079980 A1 * 4/2007 Kononenko ........... H02K 11/33 173/90
2007/0201748 A1 * 8/2007 Bixler ..................... B25F 5/001 173/48
2007/0229027 A1 * 10/2007 Roehm ................... B25F 5/021 320/114
2007/0283978 A1 12/2007 Montagnino
2008/0060487 A1 * 3/2008 Schell ................... B25B 23/147 81/469
2008/0067164 A1 * 3/2008 Kuo ....................... B23K 3/027 219/242
2008/0164842 A1 7/2008 Bergner et al.
2008/0176493 A1 7/2008 Chao
2008/0231233 A1 9/2008 Thornton
2008/0305455 A1 12/2008 Guscott
2009/0045088 A1 * 2/2009 McCray .................. B25F 5/029 206/349
2009/0183887 A1 7/2009 Baber et al.
2010/0230313 A1 * 9/2010 Allan ...................... B25B 1/103 206/373
2014/0014385 A1 * 1/2014 Kosugi ..................... B25F 5/02 173/217
2016/0129582 A1 5/2016 Ullrich
2016/0160905 A1 6/2016 Whited et al.
2016/0361771 A1 * 12/2016 Stuckey ................... B23K 3/08
2018/0111213 A1 * 4/2018 Mantes ................ B23K 3/0323
2019/0118366 A1 * 4/2019 Smallwood ............ B25H 3/003
2020/0368892 A1 11/2020 Gaddis et al.
2021/0039243 A1 2/2021 Schwarz et al.
2021/0354280 A1 11/2021 Jenkins et al.
2022/0048179 A1 2/2022 Schwarz et al.
2023/0001562 A1 1/2023 Schwarz et al.

FOREIGN PATENT DOCUMENTS

CN 205799159 U 12/2016
CN 205870210 U 1/2017
CN 209551408 U 10/2019
CN 209579120 U 11/2019
CN 209717306 U 12/2019
DE 19808450 A1 9/1999
DE 202005009258 U1 * 11/2006 ........... B23K 1/0012
DE 102017210128 A1 * 12/2018
EP 3772392 A1 2/2021
FR 1274541 A 10/1961
FR 2816860 A1 5/2002
WO 2002096606 A1 12/2002
WO 2011103636 A1 9/2011

* cited by examiner

ROTARY TOOL

CROSS-REFERENCE TO RELATED APPLICATIONS

This application is a continuation of U.S. patent application Ser. No. 16/876,821, filed on May 18, 2020, the entire contents of which is incorporated herein by reference.

FIELD OF THE DISCLOSURE

The present disclosure relates to power tools, and in particular rotary power tools.

BACKGROUND OF THE DISCLOSURE

Rotary tools transmit a rotational force to a tool accessory, which ultimately performs work on an item. Rotary tools can be used for engraving, polishing, sanding, cutting, etc.

SUMMARY OF THE DISCLOSURE

The present disclosure provides, in one aspect, a rotary tool assembly including a rotary tool having a body with a working end and a rear end, a motor disposed within the body, and a drive shaft rotatably driven by the motor. A base includes a battery receptacle configured to receive a battery pack and a stand for supporting the rotary tool when the rotary tool is not in use. The stand includes two arms defining a tool receptacle therebetween in which the rotary tool is supported. A power cord extends between the base and the rotary tool to transfer electric power from the base to the rotary tool to selectively power the motor. The battery pack is received in the battery receptacle for form a foot of the base.

The present disclosure provides, in another aspect, a rotary tool assembly including a rotary tool including a body having a working end and a rear end, a motor disposed within the body, and a drive shaft rotatably driven by the motor. A base includes a battery receptacle configured to receive a battery pack, a tool accessory holder configured to hold a tool accessory that is compatible with the working end of the rotary tool, and a stand including two arms defining a tool receptacle therebetween for supporting the rotary tool when the rotary tool is not in use. A power cord extends between the base and the rotary tool to transfer electric power from the base to the rotary tool to selectively power the motor. The battery pack is received in the battery receptacle to form a foot of the base.

The present disclosure provides, in another aspect, a rotary tool assembly including a rotary tool including a body having a working end, a rear end, and a tapered cylindrical body extending between the working end and the rear end. A motor is disposed within the body, and a drive shaft is rotatably driven by the motor. A base includes a battery receptacle configured to receive a battery pack, a plurality of holes configured to receive a plurality of tool accessories interchangeably connectable to the working end of the rotary tool therein, a rotatable dial for adjusting an operational speed of the motor and a rotational speed of the drive shaft, and a stand for supporting the rotary tool when the rotary tool is not in use. The stand includes two arms defining a tool receptacle therebetween in which the rotary tool is supported. Distal ends of the respective arms are spaced apart and define an opening therebetween. A power cord extends between the base and the rear end of the rotary tool to transfer electric power from the base to the rotary tool to selectively power the motor. The opening is sized to allow the power cord to pass between the two arms, and the battery pack forms a foot of the base to support the base on a surface when the battery pack is received in the battery receptacle.

Other aspects of the invention will become apparent by consideration of the detailed description and accompanying drawings.

DETAILED DESCRIPTION

Figure 1:
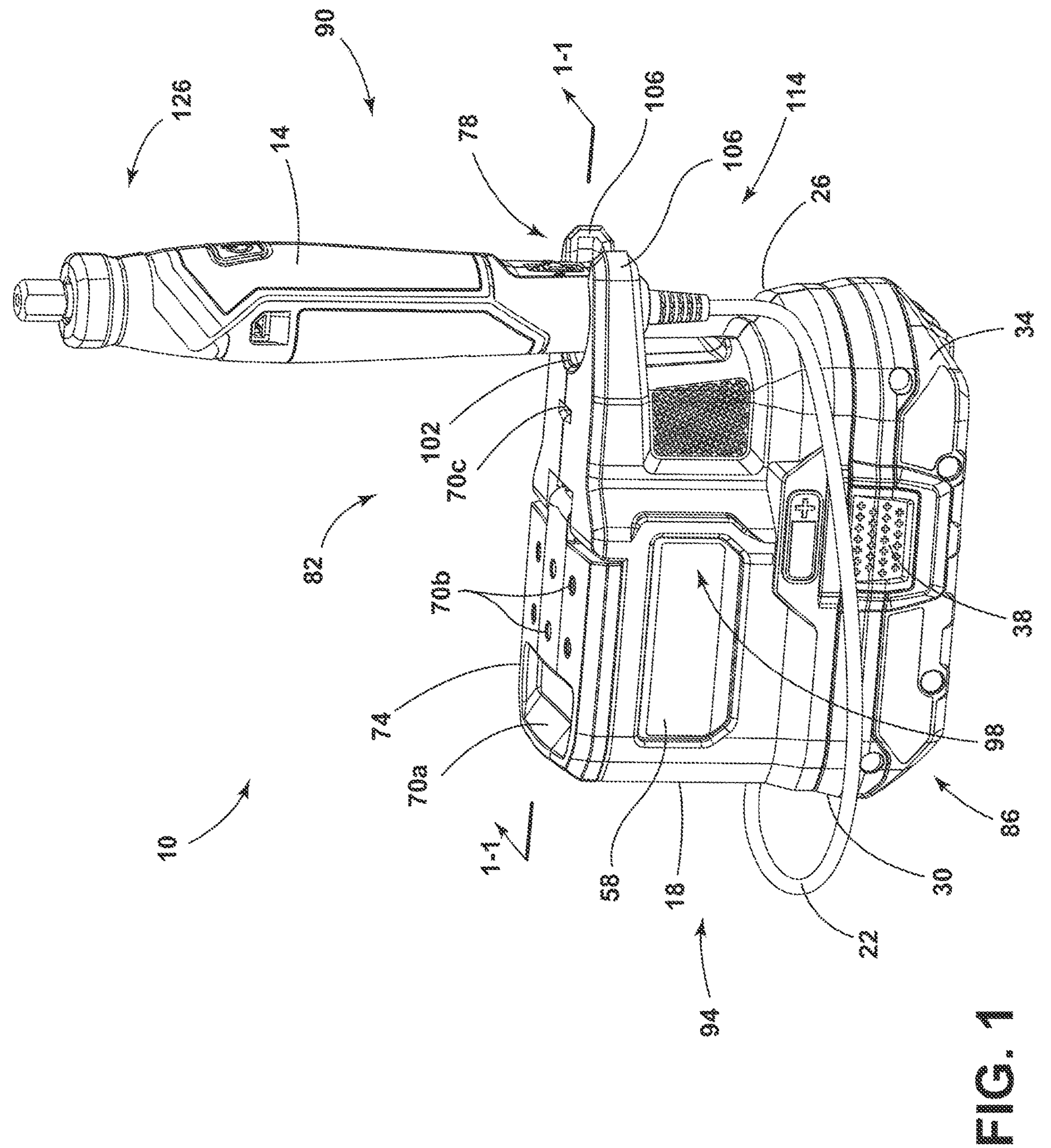
FIG. 1 is a first perspective view of a rotary tool assembly according to one embodiment.
Figure 2:
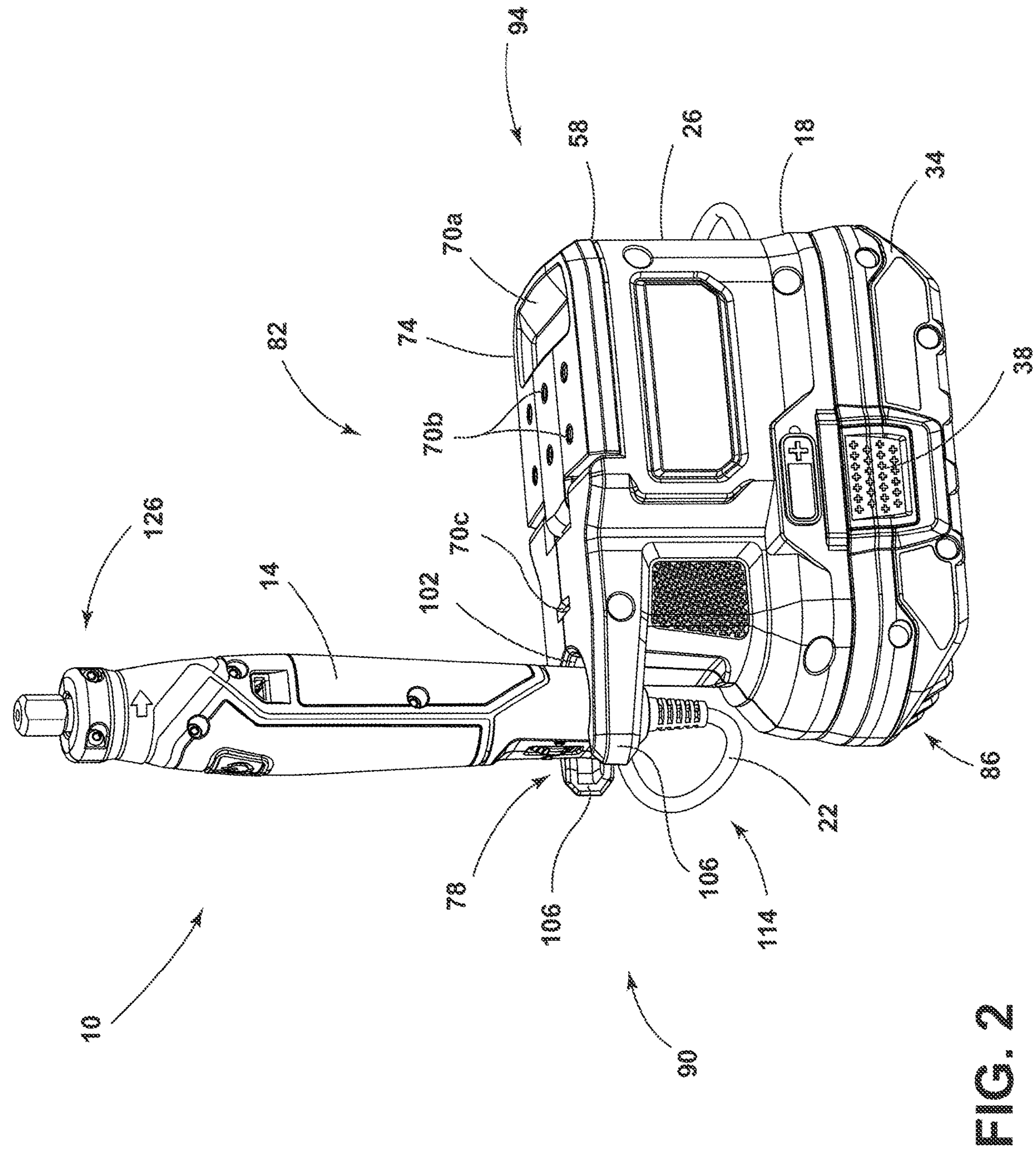
FIG. 2 is a second perspective view of the rotary tool assembly of FIG. 1.
Figure 3:
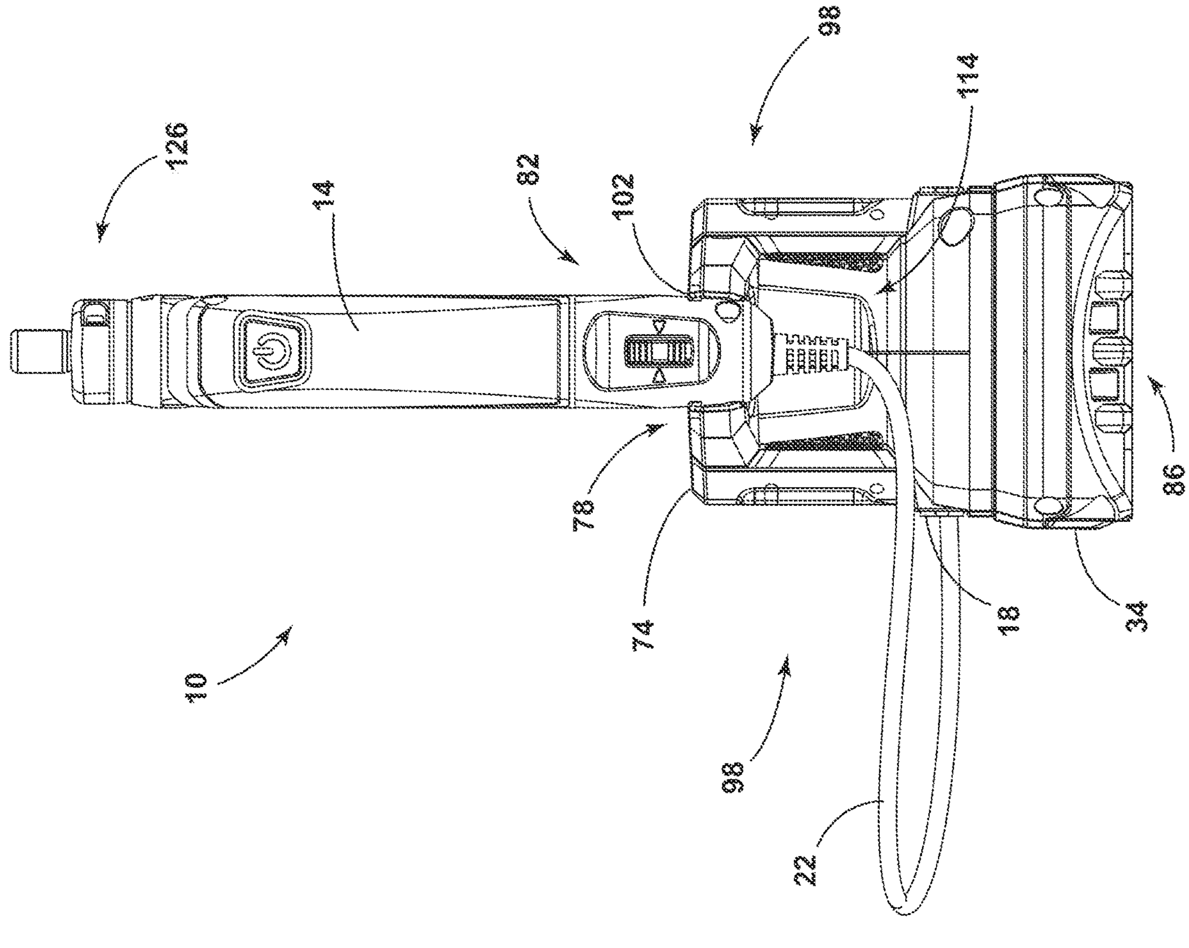
FIG. 3 is a front view of the rotary tool assembly of FIG. 1.
Figure 4:
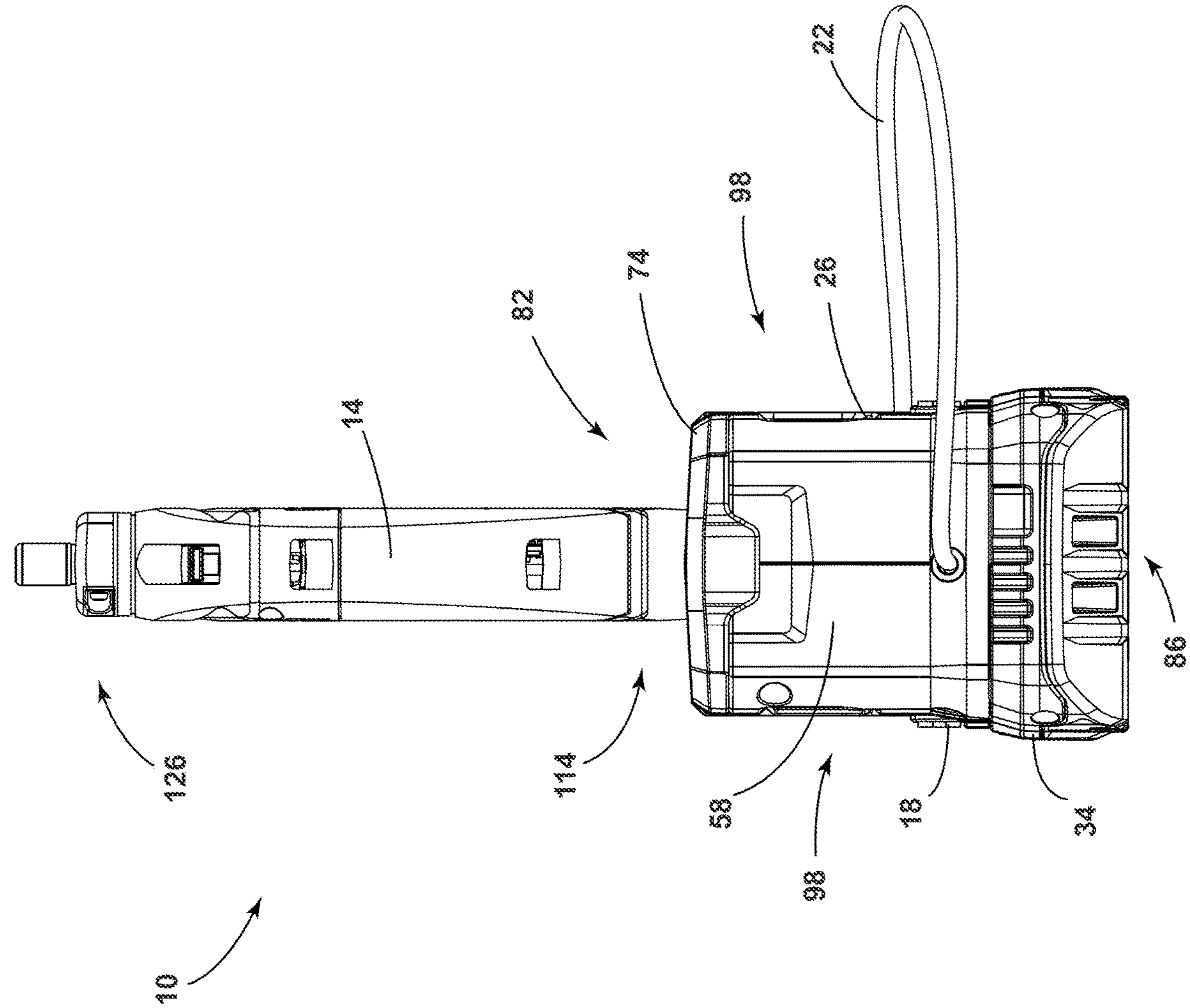
FIG. 4 is a rear view of the rotary tool assembly of FIG. 1.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

FIGS. 1-4 illustrate a rotary tool assembly 10 according to one embodiment. The rotary tool assembly 10 includes a rotary tool 14 and a base 18 coupled together by a power cord 22. The base 18 provides power to the rotary tool 14 via the power cord 22 while enabling the rotary tool 14 to move relative to the base 18. Accordingly, because the rotary tool 14 does not include an on-board power source (e.g., a battery pack), the rotary tool 14 is more compact, allowing it to be used in more confined or tighter spaces.

The base 18 includes a generally rectangular housing 26 having a top end 82, a bottom end 86, a front end 90, a rear end 94, and two opposing sides 98. The base 18 includes a battery receptacle 30 at the bottom end 86 of the housing 26 for receiving a battery pack 34 to power the rotary tool 14. Specifically, when received within the battery receptacle 30, the battery pack 34 powers the rotary tool 14 via the power cord 22. The battery pack 34 can be removed from the housing 26 by pressing a release button 38 to disengage the battery pack 34.

Figure 5:
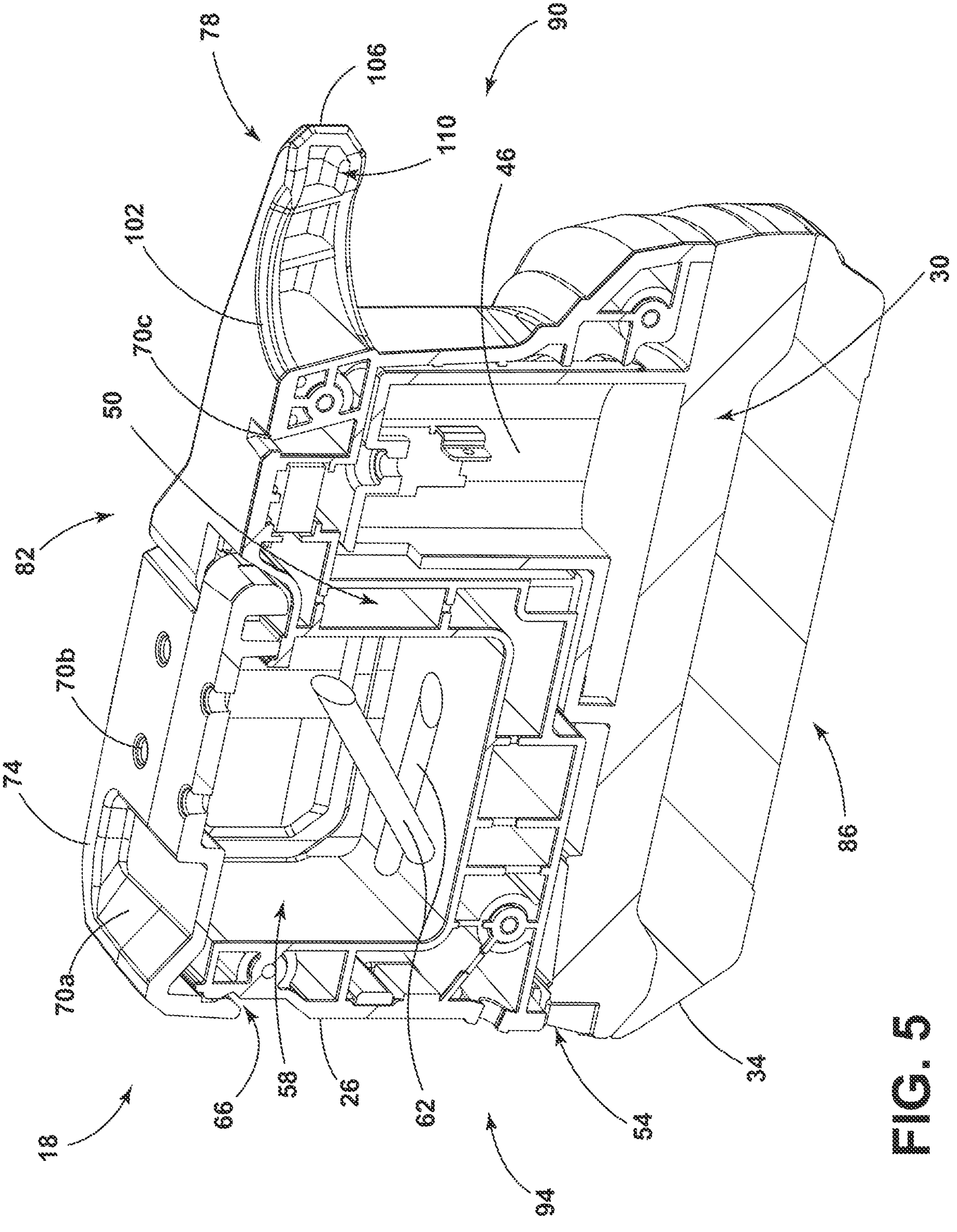
FIG. 5 a cross-sectional view of a base of the rotary tool assembly of FIG. 1 taken along section 1-1 in FIG. 1.

In the illustrated embodiment, the battery pack 34 is inserted into the housing 26 from an opening on the bottom end 86 of the housing 26. When received within the battery receptacle 30, the battery pack 34 forms the foot of the base 18 to support the base 18 on a surface. Referring to FIG. 5, in the illustrated embodiment, the battery pack 34 includes a projection 46 that extends into a first portion 50 of the battery receptacle 30, which is formed within a front half of the base 18. Additionally, the battery pack 34 extends along the bottom end 86 of the housing 26 within a second portion 54 of the battery receptacle 30.

With continued reference to FIG. 5, the base 18 further includes a storage receptacle 58 formed within the housing 26. The storage receptacle 58 can be used to store tool accessories 62 or other small objects. For example, the storage receptacle 58 may be used to store tool bits for use with the rotary tool 14. The tool accessories 62 may be interchangeably connectable to the rotary tool 14 and positionable within the storage receptacle 58 when not in use with the rotary tool 14.

In the illustrated embodiment, the storage receptacle 58 is positioned within a rear half of the housing 26 adjacent the first portion 50 of the battery receptacle 30. The storage receptacle 58 is also positioned above the second portion 54 of the battery receptacle 30.

The storage receptacle 58 includes an opening 66 on a top end 82 of the housing 26 to provide access to items being stored within the storage receptacle 58. However, in other embodiments, the storage receptacle 58 may include an opening arranged on a different portion of the housing 26, such as on a side 98 or the rear end 94 of the housing 26. Additionally, in the illustrated embodiment, the base 18 includes a cover 74 for closing the opening 66 to the storage receptacle 58. The cover 74 is movable between an open position, providing access to the storage receptacle 58, and a closed position, preventing access to the storage receptacle 58. In the illustrated embodiment, the cover 74 is pivotably coupled to the housing 26. However, in other embodiments, the cover 74 may be coupled to the housing 26 in a different manner, or may be entirely removable from the housing 26.

The base 18 further includes a series of tool accessory holders 70, which allow a user to temporarily hold a tool accessory 62 on the base 18 while working on a project. For example, a user may be working with multiple tool accessories 62 when executing a project or may need to alternate between various tool accessories 62 during the course of a project. Oftentimes a user may simply hold the various tool accessories 62 in their hand, which impedes the use of their hands. Similarly, a user may place the tool accessory 62 on the ground or other surface, which creates a risk that the tool accessory 62 may fall on the ground or roll away. Accordingly, the tool accessory holders 70 enable a user to quickly switch between different tool accessories 62 without having to hold the tool accessory 62 or risk dropping it.

In the illustrated embodiment, the base 18 includes a variety of different tool accessory holders 70. First, there is a tool accessory holder 70 in the form of a trough 70*a* formed on the cover 74 of the storage receptacle 58. The trough 70*a* is a depression formed along the top of the cover 74 to receive tool accessories 62 of different shapes and sizes. Second, there are a plurality of tool accessory holders 70 in the form of through-holes 70*b* in the cover 74 of the storage receptacle 58. The through-holes 70*a* can be used to hold any tool accessory 62 with a shaft that can be received within the through-holes 70*a*. Third, there is a tool accessory holder 70 in the form of a slit 70*c* formed on the top end 82 of the base 18. The slit 70*c* can receive any tool accessory 62 with a flattened shaft that can fit within the slit. As will be understood by a person of ordinary skill in the art, the placement, size, and shape of the tool accessory holders 70 can vary in order to accommodate different tool accessories 62.

The base 18 further includes a stand 78 configured to support the rotary tool 14 when the rotary tool 14 is not in use. The illustrated embodiment, the stand 78 extends from the front end 90 of the base 18 and includes a circular receptacle 102 for receiving the rotary tool 14. Specifically, the stand 78 includes two arms 106 extending from the front end 90 of the base 18 between which the circular receptacle 102 is defined, with which the rotary tool 14 is engageable to support the rotary tool 14 above a surface. The stand 78 includes a space 110 defined between the arms 106 and oriented transverse to the receptacle 102. In other words, the arms 106 do not touch one another, but rather, are separated to create a space 110 that allows the cord 22 to fit between the arms 106 when inserting the rotary tool 14 into the receptacle 102.

In other embodiments, the stand 78 may be positioned on the rear end 94 of the base 18, one of the sides 98, or the top end 82 of the base 18. Likewise, the stand 78 may have different sizes and shapes in order to accommodate rotary tools 14 of different sizes and shapes.

The base 18 is connected to the rotary tool 14 by the power cord 22. In the illustrated embodiment, the power cord 22 is coupled to the front end 90 of the base 18 and a rear end 114 of the rotary tool 14. The power cord 22 is flexible to allow the rotary tool 14 to move relative to the base 18. The power cord 22 may have different lengths to accommodate different types of rotary tools 14. As a non-limiting example, smaller rotary tools 14, such as engraving tools, may only need to reach a smaller area around the base 18 and thus, the power cord 22 may have a shorter length. Otherwise, larger rotary tools 14, such as die grinders or sanders, may include a longer power cord 22 to accommodate a larger working space for the rotary tool 14.

Figure 6:
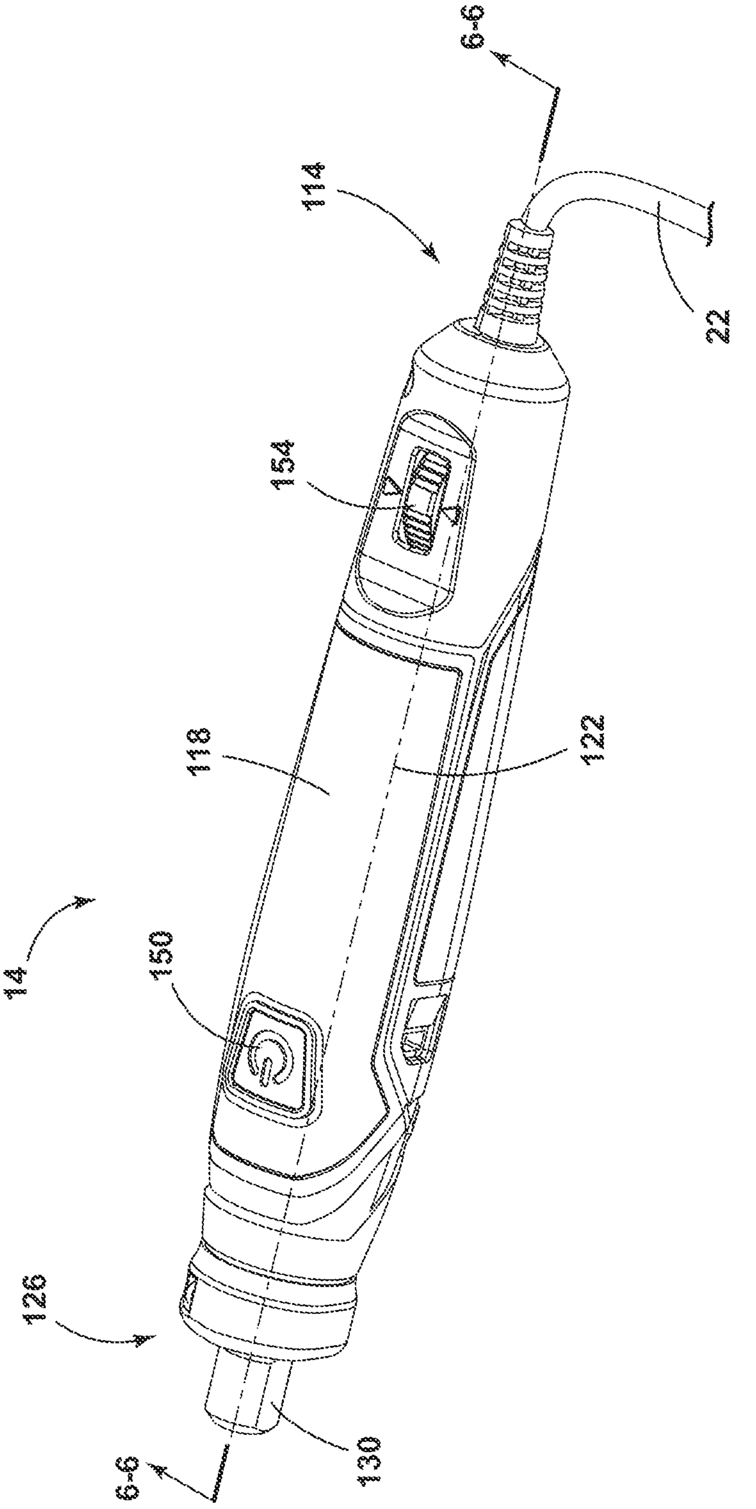
FIG. 6 is a perspective view of a rotary tool of the rotary tool assembly of FIG. 1.
Figure 7:
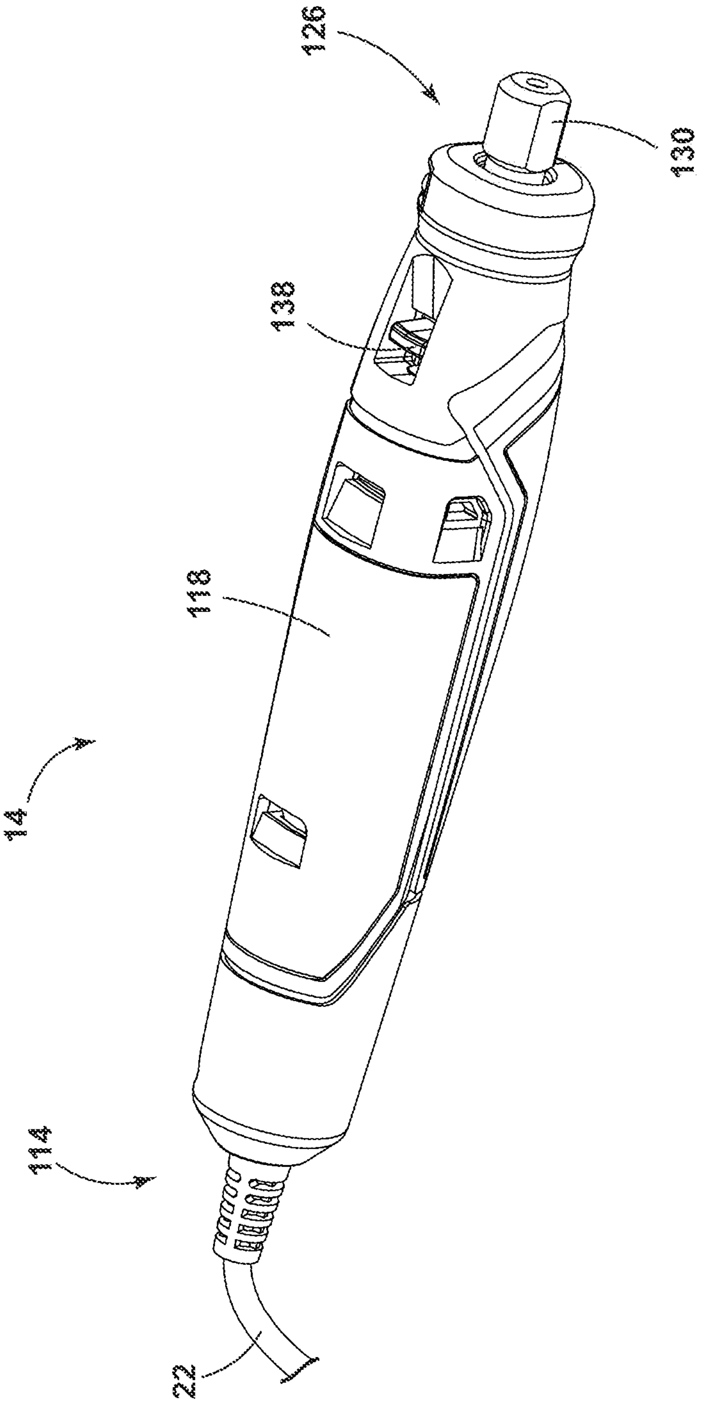
FIG. 7 is another perspective view of the rotary tool of the rotary tool assembly of FIG. 6.
Figure 8:
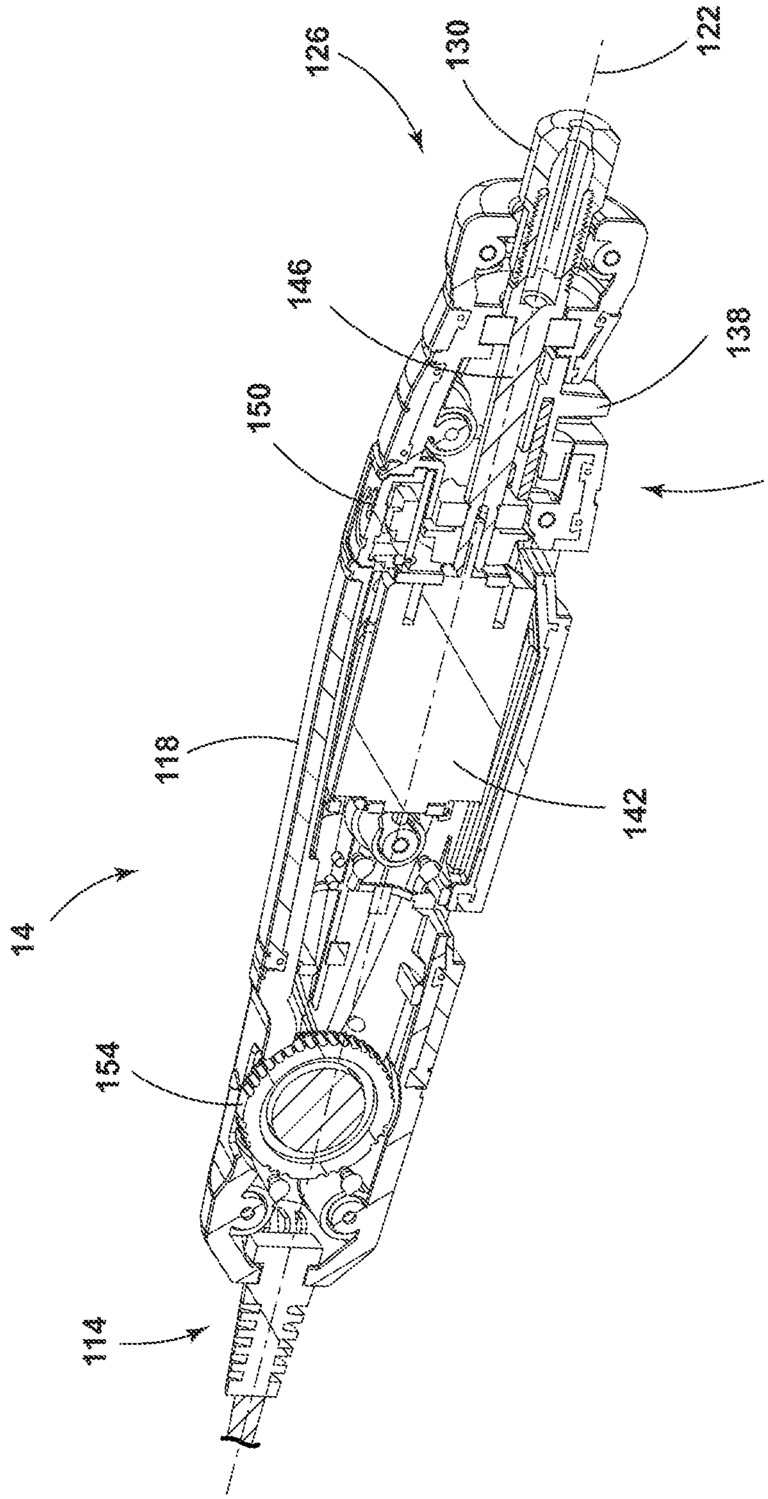
FIG. 8 is a cross-sectional view of the rotary tool of FIG. 6 taken along section 6-6 in FIG. 6.

Referring to FIGS. 6-8, the illustrated rotary tool 14 includes a tapered cylindrical body 118 defining an axis 122. The body 118 is graspable by a user during use of the rotary tool 14. The rear end 114 of the rotary tool 14 is coupled to the power cord 22 and an opposite, front end of the rotary tool 14 functions as a working end 126 of the rotary tool 14. The working end 126 of the rotary tool 14 includes a chuck 130 for attaching different tool accessories 62 to the rotary tool 14. For example, the tool accessories 62 may include, as non-limiting examples, tools for sanding, engraving, cutting, or grinding.

The stand 78 on the base 18 is sized and shaped to accommodate the size and shape of the rotary tool 14 and the power cord 22. As previously mentioned, the stand 78 includes a space 110 that is sufficiently wide to permit the power cord 22 to pass therethrough when inserting the rotary tool 14 into the receptacle 102. The inner diameter of the circular receptacle 102 is sized to be less than the largest outer diameter of the body 118 of the rotary tool 14 (e.g., proximate switch 150) in order to hold the rotary tool 14 above a surface without it sliding entirely through the receptacle 102. The inner diameter of the circular receptacle 102 is also greater than the smallest outer diameter of the body 118 (proximate the rear end 114) in order to permit the rotary tool to be lowered through 102 until reaching a mid-portion of the body where the outer diameter of the body 118 of the rotary tool 14 is nominally equal to the inner diameter of the circular receptacle 102.

Referring to FIG. 8, the rotary tool 14 includes an electric motor 142 and drive shaft 146 driven by the motor 142. The drive shaft 146 is coupled between the motor 142 and the chuck 130. The drive shaft 146 is configured to transfer torque from the motor 142 to the chuck 130 in response to activation of the motor 142. The motor 142 is selectively powered by the battery pack 34, which is disposed in the base 18 of the rotary tool assembly 10. In the illustrated embodiment, a power switch 150 (or an on/off switch) is disposed on the rotary tool 14 to selectively activate the motor 142 using power from the battery pack 34 that is transmitted through the power cord 22. In the illustrated embodiment, the power switch 150 is positioned towards the working end 126 of the rotary tool 14. However, in other embodiments, the power switch 150 may be positioned elsewhere on the rotary tool 14 or, in some cases, may be positioned on the base 18.

Figure 9B:
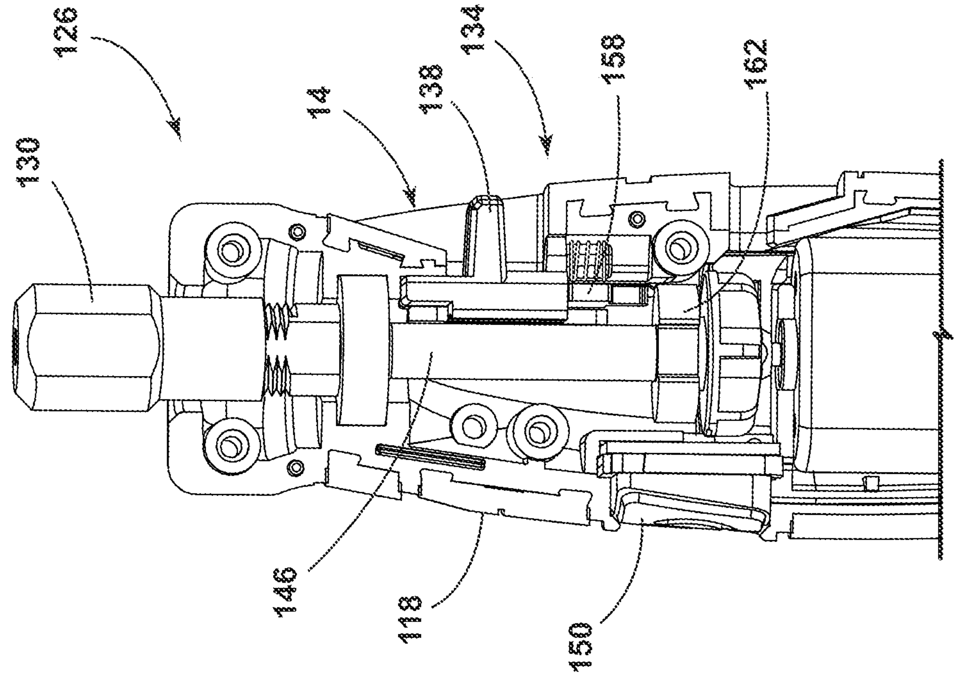
FIGS. 9A and 9B are detailed views of the rotary tool of FIG. 1, illustrating a spindle lock.
Figure 9A:
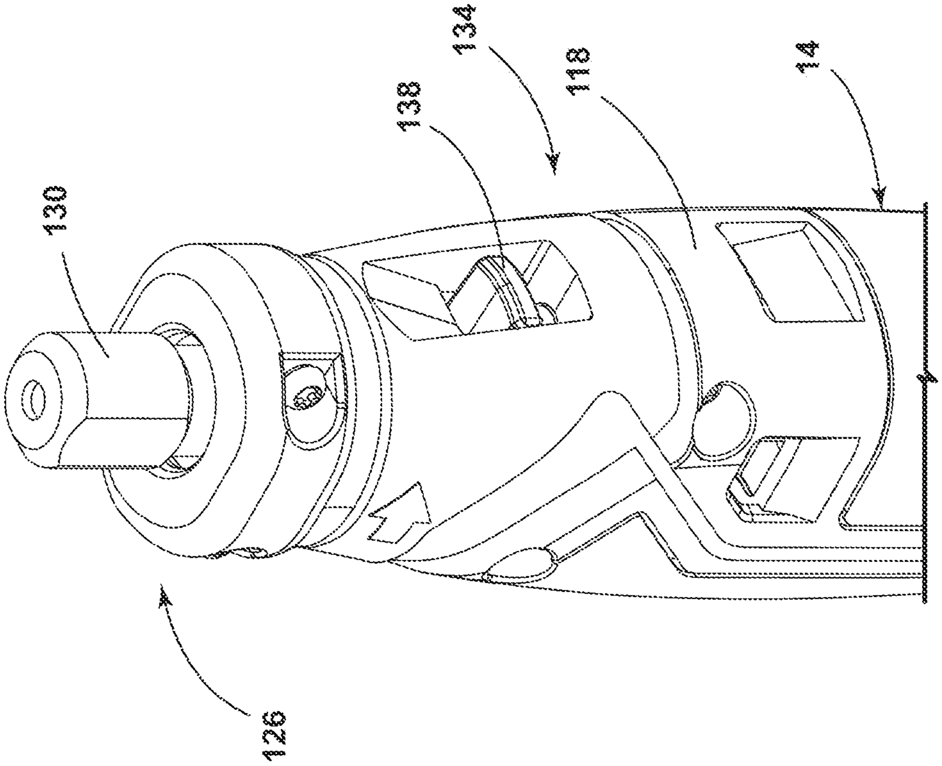

As shown in FIGS. 9A and 9B, the rotary tool 14 includes a spindle lock 134 that prohibits rotation of the drive shaft 146 when removing or attaching a tool accessory 62 from the rotary tool 14. The spindle lock 134 includes an actuator 138 that slides in a direction parallel to the axis 122 of the rotary tool 14 to lock and release the drive shaft 146. Specifically, sliding the actuator 138 in a downward direction causes a stamping member 158 to engage with a lock block 162 (e.g., in a recess formed in the lock block 162) to prevent rotation of the drive shaft 146.

The rotary tool 14 further includes a speed control 154 for adjusting the operational speed of the motor 142 and thereby, the rotational speed of the shaft 146 and the tool accessory 62. In the illustrated embodiment, the speed control 154 is a rotatable dial near the rear end 114 of the rotary tool 14. However, in other embodiments, the speed control 154 may include a different type of actuator, such as a slidable actuator or a toggle button. Likewise, the speed control 154 may be positioned elsewhere on the rotary tool 14 or, in some cases, may be positioned on the base 18.

Although the invention has been described in detail with reference to certain preferred embodiments, variations and modifications exist within the scope and spirit of one or more independent aspects of the invention as described.

What is claimed is:

1. A rotary tool assembly comprising:
- a rotary tool including
  - a body having a working end and a rear end,
  - a motor disposed within the body, and
  - a drive shaft rotatably driven by the motor;
- a base including a battery receptacle configured to receive a battery pack and a stand for supporting the rotary tool when the rotary tool is not in use, the stand includes two arms defining a tool receptacle therebetween in which the rotary tool is supported; and
- a power cord extending between the base and the rotary tool to transfer electric power from the base to the rotary tool to selectively power the motor,
- wherein the battery pack is received in the battery receptacle to form a foot of the base.

2. The rotary tool assembly of claim 1, wherein the base further includes a storage receptacle.

3. The rotary tool assembly of claim 2, further comprising a plurality of tool accessories interchangeably connectable to the working end of the rotary tool and positionable within the storage receptacle when not in use with the rotary tool.

4. The rotary tool assembly of claim 2, wherein the storage receptacle includes an opening on a top end of the base, and wherein the base includes a cover for selectively providing access to the storage receptacle.

5. The rotary tool assembly of claim 4, wherein the opening of the storage receptacle is located at a top end of the base, and wherein the battery receptacle is located a bottom end of the base.

6. The rotary tool assembly of claim 1, wherein distal ends of the respective arms are spaced apart and define an opening therebetween, and wherein the opening is sized to allow the power cord to pass between the two arms.

7. The rotary tool assembly of claim 6, wherein the stand extends from a front end of the base, and wherein the tool receptacle is circular for receiving the body of the rotary tool.

8. The rotary tool assembly of claim 1, wherein the base further includes a tool accessory holder configured to hold a tool accessory that is compatible with the working end of the rotary tool.

9. The rotary tool assembly of claim 1, wherein the battery pack is received in the battery receptacle from a bottom end of the base.

10. The rotary tool assembly of claim 1, wherein the rotary tool includes a spindle lock that selectively prohibits rotation of the drive shaft.

11. The rotary tool assembly of claim 1, wherein the rotary tool includes a speed control for adjusting an operational speed of the motor and a rotational speed of the drive shaft.

12. A rotary tool assembly comprising:
- a rotary tool including
  - a body having a working end and a rear end,
  - a motor disposed within the body, and
  - a drive shaft rotatably driven by the motor;
- a base including
  - a battery receptacle configured to receive a battery pack,
  - a tool accessory holder configured to hold a tool accessory that is compatible with the working end of the rotary tool, and
  - a stand including two arms defining a tool receptacle therebetween for supporting the rotary tool when the rotary tool is not in use; and
- a power cord extending between the base and the rotary tool to transfer electric power from the base to the rotary tool to selectively power the motor,
- wherein the battery pack is received in the battery receptacle to form a foot of the base.

13. The rotary tool assembly of claim 12, wherein the tool accessory holder includes a plurality of holes configured to hold a shaft of the tool accessory therein.

14. The rotary tool assembly of claim 12, wherein the base further includes a storage receptacle configured to store tool accessories compatible with the working end of the rotary tool.

15. The rotary tool assembly of claim 14, wherein the storage receptacle includes an opening on a top end of the base, and wherein the base includes a cover for selectively providing access to the storage receptacle.

16. The rotary tool assembly of claim 14, wherein the opening of the storage receptacle is located at a top end of the base, and wherein the battery receptacle is located a bottom end of the base.

17. The rotary tool assembly of claim 16, wherein the stand extends from a front end of the base, and wherein the battery receptacle is positioned closer to a bottom end of the base than the stand.

18. The rotary tool assembly of claim 16, wherein the tool receptacle is circular for receiving the body of the rotary tool.

19. The rotary tool assembly of claim 12, wherein the battery receptacle is positioned on a bottom end of the base.

20. The rotary tool assembly of claim 12, further comprising a plurality of tool accessories interchangeably connectable to the working end of the rotary tool and positionable within the tool accessory holder when not in use with the rotary tool.

21. A rotary tool assembly comprising:

a rotary tool including a body having a working end, a rear end, and a tapered cylindrical body extending between the working end and the rear end, a motor disposed within the body, and a drive shaft rotatably driven by the motor;

a base including a battery receptacle configured to receive a battery pack, a plurality of holes configured to receive a plurality of tool accessories interchangeably connectable to the working end of the rotary tool therein, a rotatable dial for adjusting an operational speed of the motor and a rotational speed of the drive shaft, and a stand for supporting the rotary tool when the rotary tool is not in use, the stand including two arms defining a tool receptacle therebetween in which the rotary tool is supported, wherein distal ends of the respective arms are spaced apart and define an opening therebetween; and a power cord extending between the base and the rear end of the rotary tool to transfer electric power from the base to the rotary tool to selectively power the motor, wherein the opening is sized to allow the power cord to pass between the two arms, and wherein the battery pack forms a foot of the base to support the base on a surface when the battery pack is received in the battery receptacle.

* * * * *